3,014,961
PROCESS FOR THE PREPARATION OF TEREPH-
THALIC ACID AND ISOPHTHALIC ACID
Johannes Nelles, Schkopau, and Horst Schiller, Halle,
Germany, assignors to VEB Chemische Werke Buna,
Schkopau uber Merseburg, Germany
No Drawing. Filed May 6, 1959, Ser. No. 811,267
Claims priority, application Germany July 9, 1958
6 Claims. (Cl. 260—524)

The present invention relates to the preparation of terephthalic acid and isophthalic acid, and more particularly to the preparation of these acids from a mixture of para- and meta-diethylbenzene in the liquid phase as a starting material.

Terephthalic acid is an important intermediate product for the preparation of synthetic textile fibers. Isophthalic acid is particularly useful as the starting material for the preparation of alkyd resins, polyester synthetic preparations and softeners. Resins made from an isophthalic acid resin base possess a greater viscosity and flexibility and are less toxic than the corresponding phthalic acid resins. Moreover, isophthalic acid can be rearranged thermically in the presence of catalysts into terephthalic acid.

It is well known that para- and meta-dialkylbenzene in the liquid phase can be oxidized with oxygen, or oxygen-containing gases at elevated temperatures, in the presence of catalysts, by use of organic solvents and advantageously at elevated pressure into terephthalic and isophthalic acid.

For the preparation of terephthalic acid by oxidation, it is preferable to use a para-dialkylbenzene which is readily obtainable in a pure or substantially pure form, e.g., para-xylene and para-diisopropylbenzene.

The separation of the para-xylene from a xylene isomeric mixture is carried out by the fractional crystallization of the xylene isomers at low temperatures; while, for industrial purposes the para-diisopropylbenzene is separated from a mixture of diisopropylbenzene isomers by fractional distillation.

In the industrial production of ethylbenzene, there is obtained a mixture of diethylbenzene isomers which comprise mostly para- and meta-diethylbenzene. For industrial purposes, the separation of the para-diethylbenzene from the isomeric mixture cannot be carried out by the process used for the separation of xylene and diisopropylbenzene since the fractional crystallization of the diethylbenzene isomers requires temperatures under −70° C. On the other hand, although the difference in the boiling points between the meta- and para-diethylbenzene which is about 1.5° C. may be sufficient for the separation of the isomers for laboratory purposes, the separation of these isomers by fractional distillation under industrial conditions is economically likewise not possible.

Other chemical methods for the separation of the diethylbenzene isomers are similarly unattractive. Thus, the separation of these isomers by means of sulfuric acid not only requires several relatively complicated steps, but moreover, has a strong corrosive effect on the apparatus.

Since the problem of easily separating the diethylbenzene isomers has not been technically solved, only an oxidation of mixtures of the diethylbenzene isomers is possible. Such oxidation results, of course, in a mixture of the corresponding benzene dicarboxylic acids. While the phthalic acid may easily be separated from the other dicarboxylic acids with water, the separation of the terephthalic and isophthalic acid entails considerable difficulties. For the separation of the terephthalic and isophthalic acids, it is necessary to use relatively complicated methods, e.g. fractional crystallization of the ammonium salts, fractional crystallization of the diethyl ester, or fractional esterification with methanol.

Although many attempts were made to overcome the foregoing and other difficulties, none was entirely successful when carried into practice on an industrial scale.

It has now been discovered that certain para- and meta-isomeric precursors used in the preparation of terephthalic and isophthalic acid can be easily separated in a mechanical way at a readily obtainable intermediate stage.

It is an object of the present invention to provide a process of separately preparing terephthalic acid and isophthalic acid from a mixture of para- and meta-diethylbenzene.

Another object of the invention is to provide a process for the separation of terephthalic and isophthalic acid para- and meta-precursors.

Still another object of the invention is to provide a process for the separation of the para- and meta components of an isomeric diacetylbenzene mixture which is used as the starting material in the preparation of terephthalic and isophthalic acid.

Generally speaking, the present invention contemplates the preparation of terephthalic and isophthalic acid by starting with an industrially obtainable diethylbenzene, i.e., a diethylbenzene which consists of a mixture of the para- and meta-isomers and partially oxidizing said isomeric mixture to a point where a mixture of para- and meta-diacetylbenzene is formed. The para-diacetylbenzene thus formed is a solid product with a melting point of 114° C. and the meta-diacetylbenzene will remain a liquid under the process conditions. Since the solubility of the para-diacetylbenzene in meta-diacetylbenzene at room temperatures is very small, the para-isomer crystallizes from the isomeric mixture practically quantitively. The separation of the isomers is then carried out mechanically, e.g. by centrifuging, suction, or by pressure filtration of the liquid meta-isomer from the solid para-diacetylbenzene.

In carrying the invention into practice, it is preferred to perform the partial oxidation of the para- and meta-diethylbenzene mixture in liquid phase in the presence of oxygen and a catalyst as, for example, cobalt stearate, at atmospheric pressure and at a temperature of between about 110° to 140° C.

The oxidation is interrupted when about 30–65% by weight of the corresponding isomeric diacetylbenzene mixture has been formed. In a preferred embodiment of the inventive process, the oxidation is interrupted after the formation of 50–60% by weight of the isomeric diacetylbenzene mixture. The oxidation of the diethylbenzene mixture under the given reaction conditions proceeds relatively rapidly until the mentioned concentration range of diacetylbenzene has been reached. Moreover, if the oxidation is confined to these ranges, the undesired and efficiency decreasing formation of significant amounts of organic acids, esters and resins is prevented. The entire oxidation product is then distilled. The unreacted portion of the diethylbenzene mixture as well as any ethylacetophenone formed during the partial oxidation is added to or mixed with a fresh quantity of isomeric diethylbenzene mixture and the process repeated, i.e., the partial oxidation is started anew.

The ethylacetophenone may be further oxidized to diacetylbenzene without the addition of diethylbenzene mixture.

The para-isomers that crystallize from the diacetylbenzene fraction are separated from the latter by e.g. suction-filtering, squeezing or the like. The thus separated para-diacetylbenzene may nevertheless contain sometimes small amounts of the meta-isomer, which latter in this event may be removed by treatment with aliphatic alcohols or ketones, preferably methyl alcohol or acetone. In this manner, a para-diacetyl benzene of excellent purity is obtained. (Melting point 113.5–114° C.)

The liquid moiety consists of meta-diacetylbenzene which may contain up to 2–4% of para-diacetylbenzene and extremely small amounts of ortho-diacetylbenzene. Each component, i.e., the para- and meta-diacetylbenzene is then further oxidized in known manner with oxygen or an oxygen-comprising gas to form the respective terephthalic and isophthalic acid, i.e., the oxidation is carried out in an organic solvent, e.g. an aliphatic carboxylic acid and a catalyst, or in an alkaline hypochlorite solution.

For the purpose of giving those skilled in the art a better understanding of the invention as well as a better appreciation of the advantages of the invention, the following illustrative examples of the invention are given.

Example 1

400 parts by weight of industrially produced diethylbenzene containing about 30% of para-diethylbenzene were oxidized with oxygen in the phesence of 0.5 part by weight of cobalt stearate for 12 hours at a temperature of between 110° and 130° C. and under atmospheric pressure. The oxidation was then interrupted and, after distillation of the oxidized product, the following products were obtained:

|  | Parts by weight |
|---|---|
| Diethylbenzene | 29 |
| Ethylacetophenone | 167 |
| Isomeric mixture of diacetylbenzene | 212 |

The diacetylbenzene isomeric mixture was cooled to about 10° C. and the separation of the isomers was carried out by pressure filtration. Out of the 212 parts by weight of the isomeric diacetylbenzene mixture, there was obtained 67 parts by weight of para-diacetylbenzene and 144 parts by weight of meta-diacetylbenzene.

The para-diacetylbenzene thus obtained is then oxidized, e.g., with an alkaline sodium hypochlorite solution, to yield about 95% terephthalic acid which is 99% pure. In a similar manner, the meta-diacetylbenzene is used as the precursor to produce isophthalic acid which will contain at the maximum from about 2% to about 4% of terephthalic acid.

Example 2

A mixture comprising 224 parts by weight of a technical isomeric diethyl benzene and 176 parts by weight of ethylacetophenone is admixed with one part by weight of cobalt stearate, whereafter the reaction mixure is oxidized with oxygen for 11 hours at a temperature of 110 to 120° C. and under atmospheric pressure. The ethylacetophenone was obtained according to Example 1.

After completed oxidation, 435 parts by weight of a reaction product are obtained, which reaction product upon distillation yields the following components:

31 parts by weight of diethyl benzene
165 parts by weight of ethylacetophenone
223 parts by weight of diacetyl-benzene, and
24 parts by weight residue.

The residue referred to consists mainly of acetyl benzoic acids, esters and resins.

The diacetylbenzene mixture is separated as described in Example 1, whereby 68 parts by weight of para- and 154 parts by weight of meta-diacetylbenzene are obtained.

In order to remove residual meta-diacetylbenzene from the separated para-diacetylbenzene, the latter is digested with 50–100% by weight of acetone. The digestion is performed at +10 to 20° C., whereafter the reaction mixture is filtered by suction and dried. In this manner, 64 parts by weight of a very pure paradiacetylbenzene (Fp 113, 5° C.) are obtained, which product upon the subsequent oxidation yields solely para-benzene-carboxylic acids.

100 parts by weight of para-diacetylbenzene are suspended in 500 parts by weight of acetic acid. 0.5 part by weight of manganese acetate and 0.5 part by weight of cobalt acetate are added, whereafter the entire reaction mixture is oxidized for 8 hours with oxygen at a temperature of 110° C. The terephthalic acid formed is sucked off, washed with water and acetone and dried at a temperature of about 130° C. In this manner, 92 parts by weight of terephthalic acid having an acid number of 671 mg. KOH/g. are obtained. The theoretical acid number would be 675 mg. KOH/g.

The oxidation of the meta-diacetylbenzene is carried out in the same manner as that of the para-isomer. 88 parts by weight of isophthalic acid are obtained from 100 parts by weight of meta-diacetylbenzene. The acid number is 673 mg. KOH/g. The amount of terephthalic acid in the iso-acid was about 3%.

Example 3

600 parts by weight of ethyl-acetophenone which was obtained during the oxidation of the diethylbenzene according to Example 1, are oxidized with oxygen in the presence of 1.5 parts by weight of cobalt stearate for 11 hours at 130° C. The reaction mixture (632 parts by weight) is treated with a sodium carbonate solution and is thus separated into neutral and acid components. By acidifying, 38 parts by weight of a crude acetyl benzoic acid are obtained from the aqueous solution.

The distillation of the neutral component yielded 154 parts by weight of ethylacetophenone, 391 parts by weight of diacetylbenzene and 28 parts by weight of a viscous resin.

By suction filtration and pressing at about 15° C., 119 parts by weight of para-diacetylbenzene are separated from the diacetylbenzene fraction. The liquid component consists of 271 parts by weight of meta-diacetylbenzene with a para content of about 2–4% and extremely small amounts of the ortho-isomer.

The further oxidation of the para- and meta-diacetylbenzene, respectively to terephthalic and isophthalic acid, respectively, was performed as indicated in Examples 1 and 2.

It is to be observed that the present invention provides for a two-stage method for the preparation of terephthalic and isophthalic acid from a starting material composed of a mixture of para- and meta-diethylbenzene isomers comprising the steps of partially oxidizing said isomeric mixture until about 30–65%, preferably 50–60% of the corresponding intermediate mixture of para- and meta-diacetylbenzene is formed, separating the intermediate from the starting material, the para-isomer being at this stage a solid, the meta-isomer being a liquid, mechanically separating the solid isomer from the liquid isomer, i.e., by centrifuging, suction, or filtration and them, separately oxidizing the para- and meta-intermediates to form the corresponding separate terephthalic and isophthalic acid products.

What is claimed is:
1. A process for the preparation of terephthalic acid and isophthalic acid in two steps which comprises oxidizing with an oxygen-containing gas a mixture of a para- and meta-diethylbenzene at elevated temperature in the range of 110–140° C. in the presence of cobalt stearate as catalyst whereby a mixture of para- and meta-diacetylbenzene is formed in the first step, interrupting the oxidation when about 30 to 65% by weight of the mixture of para- and meta-diacetylbenzene has formed, separating said mixture of para- and meta-diacetylbenzenes from the reaction mixture by distillation, cooling the mixture of para- and meta-diacetylbenzenes below the melting point of the para-isomer, separating the solid para- from the liquid meta-isomer and then individually oxidizing in a second step the para- and meta-diacetylbenzene intermediates respectively in the presence of an oxidation catalyst by an oxidizing agent selected from the group consisting of oxygen and an alkaline hypochlorite solution whereby the temperature range is from 95–118° C.

with the oxygen and from 50–80° C. with the hypochlorite solution, forming thereby the separate terephthalic and isophthalic acid products.

2. The process as claimed in claim 1, wherein the intermediate para- and meta-diacetylbenzene isomers are mechanically separated by centrifuging.

3. The process as claimed in claim 1, wherein the intermediate para- and meta-diacetylbenzene isomers are mechanically separated by filtration.

4. The process as claimed in claim 1, wherein the mixture of meta- and para-diacetylbenzenes is cooled down to temperatures between 5° and 20° C. for the solidification of the para-isomer and thereafter separating by filtration the solid para- from the liquid meta-isomer.

5. The process as claimed in claim 1, wherein traces of meta-diacetylbenzene contained in said separated para-diacetylbenzene are removed by treating said para-diacetylbenzene with a solvent selected from the group consisting of methyl alcohol, ethyl alcohol, propyl alcohol, isopropyl alcohol, acetone and methyl ethyl ketone.

6. In a process as claimed in claim 1, wherein the oxidation of said para- and meta-diethylbenzene mixture is interrupted when about 50–60% by weight of said para- and meta-diacetylbenzene has been formed.

References Cited in the file of this patent
FOREIGN PATENTS
770,224    Great Britain _____ Mar. 20, 1957